Dec. 22, 1970   MASAYASU ARIKAWA ET AL   3,548,489
ONE-SIDE BACK BEAD-FORMING BUTT-WELDING PROCESS USING
A THERMOSETTING BACKING COMPOSITE
Filed July 31, 1967

Masayasu Arikawa
Katsuzo Iio
INVENTORS

BY Wenderoth, Lind and
Ponack, Attorneys

United States Patent Office 3,548,489
Patented Dec. 22, 1970

3,548,489
ONE-SIDE BACK BEAD-FORMING BUTT-WELDING PROCESS USING A THERMOSETTING BACKING COMPOSITE
Masayasu Arikawa and Katsuro Iio, Fujisawa-shi, Japan, assignors to Kobe Steel Ltd., Fukiai-ku, Kobe, Japan
Filed July 31, 1967, Ser. No. 657,197
Claims priority, application Japan, Aug. 4, 1966, 41/51,391
Int. Cl. B23k 5/22, 31/02
U.S. Cl. 29—491                    7 Claims

ABSTRACT OF THE DISCLOSURE

A one-side back bead-forming butt-welding process using a thermosetting backing composition wherein a powdery backing composition is applied against the underside of the groove between workpieces to be welded together and said workpieces are butt-welded on the upperside of said groove, said backing composition including thermosetting resin powder, iron powder, and slag forming agent, wherein said thermosetting resin in said composition may be set and solidified before or only under the influence of the heat of welding to bring the composition into intimate contact with the underside of the workpieces.

BACKGROUND OF THE INVENTION

In one of the prior art butt-welding processes for relatively large and/or thick steel workpieces, generally, two steel workpieces are first aligned edge to edge leaving a predetermined space or groove between their opposite edges where metal is to be deposited and a welding operation is performed on the upperside of the groove. After the upperside of the groove has been welded, the workpieces are then reversed so as to make the yet-to-be welded underside of the workpieces the top and thereafter, the workpieces are welded on the present upperside of the groove repeating the same porcedure which was followed in welding the first upperside of the groove. However, the reversing of such heavy workpieces in the course of the welding operation is rather troublesome and this fact presents a grave impediment to the automation of various processes for welding large size and/or thick workpieces.

In building or assembling ships, bridges, storage tanks and the like huge structures, the so-called one side butt welding process has been proposed and practiced by some people in the industry. According to this process, steel plates are welded on only one side thereof so as to form back beads on the other or opposite side of the workpieces. However, such a welding process has been exclusively performed by directing the welding rods downward. At present, when the welding operation is performed along curved sections of workpieces and the upward welding operation is performed, a combination of gouging and back bead forming welding has been relied upon. Although the one-side back bead-forming welding process has been practiced by some people in the industry for welding curved sections of workpieces or welding the workpieces from the lower portions to the upper portions thereof with the use of hand welding rods for back-bead-forming, such process has presented various problems, for example, it is difficult to obtain precisely defined grooves between workpieces, proper seams of beads, and skilled workers, and therefore, the process has not been yet commonly and widely practiced in the industry.

Of late, improved side butt-welding processes for relatively large and/or thick steel workpieces have been developed. In one of these newly developed one side butt-welding processes, as a preparatory step, two steel workpieces are aligned edge to edge with a space or groove formed between their opposite edges where metal is to be deposited and a copper alloy backing block is applied against the underside of the workpieces at the bottom of the groove and then, the workpieces are butt-welded from the upperside of the groove. In another newly developed one side butt-welding process, two steel workpieces are aligned in the manner as described above and a suitable powdery backing composition is disposed on the underside of them at the bottom of the groove and then the workpieces are butt-welded from the upperside of the groove. However, both of these newly developed one side butt-welding processes have inherent disadvantages; that is, in the one side butt-welding process using the copper alloy backing block, if there is any clearance or clearances between the steel workpieces and the backing strip, molten metal flows into the clearance or clearances and a fin or fins are caused to form in the clearance or clearances and in addition, slag may be incorporated into the molten metal. Furthermore, since both the steel workpieces and the copper alloy backing strip are rigid bodies, if the workpieces have ragged portions and/or curvatures on their underside the backing block often does not contact the underside of the workpieces to be welded together evenly. In addition, should the copper alloy backing block be a grooved block, there is the possibility of insufficient depth of penetration due to flow of molten metal into the groove of the backing block and forming metal deposits, overlaps, undercuts and the like in the backing block groove.

On the other hand, the one side butt-welding process using the powdery backing composition is superior in some aspects to the one side butt-welding process using the copper alloy backing block, but even when the powdery backing composition-type one side butt-welding process is employed, it is not easy to at all times insure that the backing composition can positively and uniformly contact at all the points of the underside of the workpieces.

SUMMARY OF THE INVENTION

The present invention relates to an improved one side butt-welding process for steel workpieces, and more particularly to an improved one side butt-welding process for large size and/or thick steel workpieces such as parts of vessels, buildings, bridges and other steel constructions in which steel workpieces which are aligned edge to edge with a groove formed between their opposite edges and with a backing composition disposed at the bottom of the groove and held against the workpieces by means of a supporting member are welded from their upperside and to a novel composition suitably employed as such a backing composition in carrying out the one side butt-welding process.

One object of the present invention is to provide a one-side back bead-forming butt-welding process which can be applied to both curved surface welding and upward welding as well as to downward welding.

Another object of the present invention is to provide a one-side back bead-forming butt-welding process which, when applied to downward welding, can be performed with the use of jigs and devices which are lighter in weight and smaller in size than those which were necessary for any prior art one-side back bead-forming butt-welding process.

Another object of the present invention is to provide a one-side back bead-forming butt-welding process in which, when applied to curved surface and upward welding, the process can be performed without the necessity for precisely forming a groove between workpieces and for high degree of skill on the part of workers but can form a smooth and continuous back bead.

A further object of the present invention is to provide a one-side back bead-forming process in which even when any irregular groove between workpieces is welded, there is no possibility of deposit metal falling and/or dripping down from the welded groove.

A further object of the present invention is to provide a one-side back bead-forming butt-welding process in which even when the workpieces are welded from only one side, a satisfactory back bead appearance can be obtained and a backing block which upholds a backing composition in contact with the underside of workpieces can be protected from an electric arc.

A further object of the present invention is to positively hold a specific flux or backing composition against the workpieces when the upward and curved surface welding operations are performed on the workpieces.

The present invention is distinguished from the prior art butt-welding processes in which steel workpieces aligned to be joined together are preheated and then a backing composition which has been held against the underside of the workpieces at the bottom of the groove between the workpieces in a powdery form is heated so as to have the composition solidify and positively adhere to the workpieces. In the present invention it is not necessary to preheat the workpieces, and a novel powdery backing composition containing slag forming agent and thermosetting resin powder which has been previously solidified by heating the same is applied against the underside of the steel workpieces at the bottom of the groove between the workpieces and firmly held in position by a backing block which holds the composition up from the bottom. Thereafter, an electric arc welding operation is initiated from the upperside of the workpieces along the groove or weld line.

The present invention is applicable to steel workpieces of any chemical composition, any thickness and/or sizes; that is, the workpieces may be carbon steels or steel alloys having different chemical compositions and varying thicknesses and/or sizes. In addition, the weld line or groove where metal is to be deposited by the butt-welding may be straight, curved or any combination of curved and straight sections. And the welding position may be horizontal, vertical or slanted. However, the opposite edges of workpieces to be butt-welded preferably form a beveled groove which has a V-section, a Y-section or an I-section. The groove needs not have an open bottom or root, but an opening up to 10 mm. at the bottom or root of the groove is workable. In some cases, the workpieces to be welded together may be of different thicknesses, or the workpieces may be laid and welded at different heights from each up to 3 mm. The backing block to be employed in performing the process by the invention may be and is usually formed of aluminum, aluminum alloys, copper or copper alloys. The backing block preferably has as small a thickness as possible and the thickness of the backing block is selected depending upon the length of the weld line between the workpieces to be butt-welded. The configuration of the backing block is also determined in conformity with the specific configuration of the weld line (straight or curved configuration). The backing block may be a plain plate or a plate having a longitudinal groove on one side extending along the direction in which the weld line extends when the block is applied on the underside of the workpieces. Thus, the groove formed on the backing composition supporting side on the backing block can conveniently receive a backing composition thereon. The groove to be formed on the backing block side has capacity enough to receive a predetermined amount of a backing composition which may be determined depending upon specific factors involved in the butt-welding operation to be performed, but usually the backing block groove is a shallow and wide one. The upper edges of the opposite side walls of the backing block groove are preferably inwardly bent so that the backing composition will not come out of the groove.

The slag forming agent to be contained in the backing composition employed in the novel process is not limited to only an agent which has a specific grain size, but may be any one selected from those which have been conventionally employed as the slag forming agents in the conventional backing compositions for welding purposes. The slag forming agents to be employed in the backing composition in performing the present invention may be fluxes which have been commonly employed for the same purpose. One typical prior art flux is comprised of oxides such as $SiO_2$, $Al_2O_3$, $TiO_2$, $ZrO_2$, MgO, CaO and BaO in a powdery form, halide such as $CaF_2$ in a powdery form, metallic carbonates such as $CaCO_3$, $BaCO_3$ and $MgCO_3$ in a powdery form and Fe, Fe-Si, Fe-Mn, Fe-Ti and Fe-Al in a powdery form. The above flux or slag forming agent is preferably employed in at least 9% by weight based on the weight of the total backing composition. Preferably, iron powder is also added to the backing composition in a suitable amount. The amount of iron powder to be added to the backing composition may vary within a range of 10–90% by weight based on the weight of the total backing composition and in some cases the additive iron powder may be in a form of an iron alloy containing another metallic constituent or constituents. As the welding operation proceeds, the additive iron powder in the backing composition forms a wave-shaped back bead line at the bottom of the groove being welded while the slag forming agent in the same backing composition and thereby the amount of metal deposited on the workpieces is increased.

As the welding operation proceeds, the additive iron powder melts together with the slag forming agent within the backing composition and the molten iron powder forms a wave-shaped back bead line on the underside of the workpieces along the bottom of the weld line or groove being welded. The supply of metal from the molten backing composition is quite effective in carrying out the novel one side back bead forming butt-welding process because the molten iron powder merges into the molten metal from the other constituents of the backing composition and thereby the amount of metal deposited on the workpieces is increased.

As pointed hereinabove, according to the novel buttwelding process of the present invention, with the use of the iron powder large and/or thick steel workpieces can be butt-welded from just the upper side thereof with the backing composition held against the opposite or underside of the workpieces without the necessity for reversing the workpieces because the molten backing composition provides deposit metal on the underside of the workpieces and a high quality weld can be obtained without such disadvantages as insufficient deposition of metal, overlaps and undercuts which have been inevitable in performing the prior art one side butt-welding processes.

The thermosetting resin to be contained in the backing composition in performing the novel process is a binding agent which melts and solidifies the other principal backing composition constituents when the resin is heated to a temperature up to 450° C. Examples of binding agents to be employed in the backing composition in performing the novel process are phenol resin, epoxy resin and isocyanate. The temperature to which the thermosetting resin is heated is limited to 450° C. because, if the thermosetting resin is heated above the specified temperature, the organic ingredient or ingredients of the resin are carbonized whereby the flux solidified by the resin or binding agent may be rendered fragile. The amount of the resin to be employed as the binding agent for the principal constituents of the backing composition can not be strictly defined by any numerical value; it can be merely said that the resin may be used in an amount sufficient to solidify the principal backing composition constituents. When the binding agent is a thermosetting resin, generally, the amount of the binding agent is preferably within the range of 0.2 to 4.0% by weight based on the weight of the total backing composition.

The backing composition should be solidified at latest just prior to the initiation of the butt-welding operation. The backing composition received in the groove on the backing block may be heated before the welding operation is initiated or during the welding operation as desired. If the backing composition is to be heated before the welding operation is initiated, the backing composition may be heated by directing the flame of a burner, for example. When a plurality of backing blocks having the backing composition in their grooves are employed, the backing blocks are first placed in a heating furnace and they are simultaneously heated. The heating of the backing block having the backing composition in its groove may be made just before the initiation of a welding operation in the field where the workpieces are permanently installed for service or may be previously heated in a work shop. Backing blocks having the heat-solidified backing composition in their grooves may be packaged and the packaged backing blocks may be put to market as commercial goods.

Backing blocks having heat-solidified composition in their grooves may be applied against the underside of workpieces to be joined together in any of the many conventional ways. For example, the backing blocks may be directly applied against the workpieces by conventional mechanical means, by holding the backing blocks against the workpieces with the use of specific support means (the support means are secured to the underside of the workpieces by tack welding or magnets) or by inserting wedges between the backing blocks and the support means. In addition to the above ways, there are many other ways for securing the backing blocks to the workpieces. When backing blocks having heat-solidified backing composition received in their grooves are employed, the welding operation can be performed by any one of the welding processes—downward, horizontal, upward, circular or other. In any of the above-mentioned welding processes, the solidified backing composition is applied against the underside of workpieces to be joined at the bottom of the groove formed between the workpieces by a backing block or backing blocks and then the butt-welded operation is initiated. The dimensions of the groove may be varied over a relatively wide range. In the prior art hand welding process in which a back bead forming welding rod is employed as a sole source for providing deposit metal, since no backing block is employed on the underside of workpieces at the bottom of the weld line or groove formed between the workpieces, if the weld line or groove has a width wider than the diameter of the welding rod the welding operation must be performed by securing a consumable plate to the underside of the workpieces by tack welding, for example and after the welding operation has been completed on the top of the groove, the consumable plate must be melted away by gouging and then the welding in a next cycle operation must be repeated at the bottom of the weld line. Therefore, the width of the groove must be strictly maintained within ±3 mm. of the diameter of the welding rod employed. However, when a previously solidified backing composition is applied against the underside of workpieces at the bottom of the weld line or groove formed between the workpieces, the width of the groove may deviate from the diameter of the welding rod within the range of 0 to 10 mm. In view of the present situation in the industry to which the present invention pertains, the fact that the groove width can be greater than the diameter of the welding rod employed is quite significant.

When the backing composition is heated during a welding operation, the heat generated by the welding operation is utilized as the heat source for solidifying the backing composition. In this case, the backing composition is preheated by the heat transferred from a point in the groove where the welding was initiated whereby the resin content in the backing composition is first melted so as to render the principal powdery backing composition constituents into a solidified state whereupon the whole backing composition can firmly adhere properly and uniformly to the workpieces to be joined together, following the contour of the workpieces being welded resulting in decrease of formation of fines attributable to the flowing out of molten metal and in formation of a uniform wave-shaped back bead on the underside of the workpieces at the bottom of the groove.

Furthermore, since the powdery backing composition has been previously solidified as a result of the melting of the resin powder contained in the backing composition, the composition can be effectively compressed by the weight and expansive force of an air hose which is disposed within the groove in the backing block over the backing composition when the hose is supplied with compressed air, and as a result, the backing composition is caused to solidify just before the welding of workpieces thereby ensuring close contact of the composition with the workpieces and preventing fins from being formed on the weld. In addition, the formation of the slag is effective in providing a quite smooth and uniform wave-shaped back bead line.

The final pass which is to be performed on the topside groove in carrying out the welding process by the present invention may be made by any of the conventional processes—hand welding, semi-automatic welding, and automatic welding (carbonic acid gas-shielded welding, inert gas-shielded welding, submerged arc welding, electro-slag welding and non-shielded welding), but in any of the above-mentioned processes the welding rod to be employed should be a consumable wire electrode. The above-mentioned various welding processes may be suitably selected depending upon the welding conditions such as voltage, amperage and velocity.

PREFERRED EMBODIMENTS OF THE INVENTION

Figure 1:
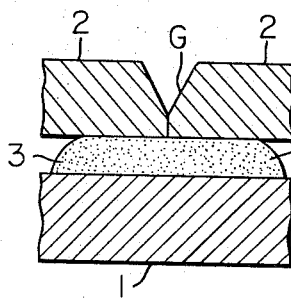
FIGS. 1 through 4 are fragmentary views in section illustrating different arrangements with which the novel one-side back bead-forming butt-welding process according to the present invention is carried out.

Referring now to the figures of the accompanying drawings, and more particularly to FIG. 1 thereof, two steel workpieces 2 and 2 having opposing bevelled edges are shown as being aligned edge to edge in the same plane so as to define a Y-shaped groove G between their opposing bevelled edges. A suitable backing composition 3 is disposed on the underside of the workpieces 2 right below the groove G covering an area at and in the vicinity of the bottom of the groove. The backing composition 3 is held against the underside of the workpieces 2 and 2 from below by means of a suitable backing block 1 which is in turn upheld by a conventional base construction disposed below the block (not shown). Thus, it will be understood that the backing composition 3 is held in position in a compressed condition between the workpieces 2 and 2 and the supporting unit comprising the backing block 1 and conventional base construction by the weight of the workpieces and the cooperating supporting action of the upholding unit.

Figure 3:
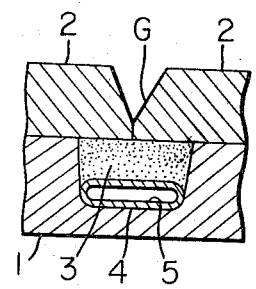

When it is desired to obtain a more positive or effective contact of the backing composition 3 with the workpieces 2 and 2, the arrangement as shown in FIG. 3 is preferably employed. In this arrangement, the backing block 3 is formed on the upper surface thereof with a longitudinal recess 4 which extends along the bottom of the groove G when the backing block is disposed on the underside of the workpieces and an air hose or an air bag 5 is disposed within and along the longitudinal recess 4. The backing composition 3 is filled within the block recess 4 over the air hose 5. With this arrangement, when the air hose 5 is supplied with compressed air from a suitable compressed air supply source (not shown), so as to expand the hose, the expanded air hose 5 pushes up and compresses the backing composition 3 against the workpieces 2 and 2 whereby the push-up and compressed backing composition 3 can be positively abutted against the underside of the workpieces 2 and 2 at the bottom of the groove G resulting in close contact of the composition with the workpieces. The arrangement of FIG. 3 is particularly preferable when the workpieces 2 and 2 are relatively great in thickness and light in weight.

Figure 2:
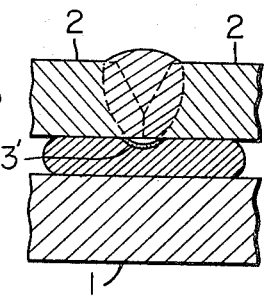
Figure 4:
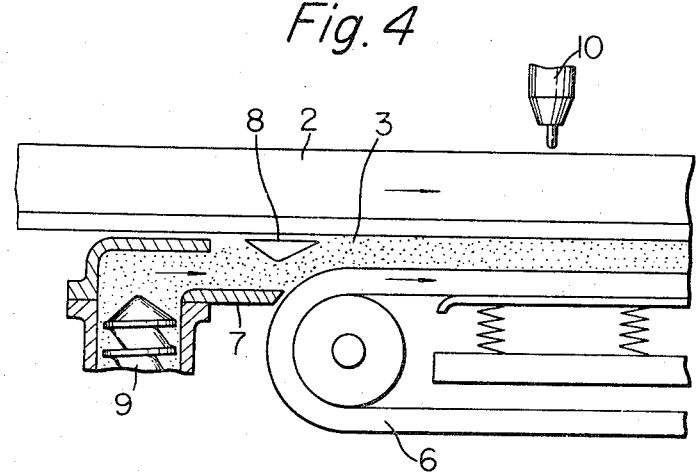

If the novel one-side butt-welding process is carried out while the workpieces 2 and 2 are advancing through the welding station in a welding system, an arrangement as shown in FIG. 4 is employed. In such an arrangement, an endless belt 6 is employed in place of the stationary backing block 1 shown in FIGS. 1 through 3. A lower backing composition receiving or guide member 7 and an upper scraper 8 are provided in the vicinity of one or the inlet end of the belt 6. A backing composition feeder 9 in a screw form is provided on the side of the receiving member 7 opposite the belt 6. With the above arrangement, when the feeder 9 is operated or rotated by a suitable conventional drive means (not shown), the feeder 9 continuously feeds the backing composition 3 upward in a controlled rate through the receiving member 7 onto the moving belt 6. The backing composition 3 may be conveyed on the belt 6 in a controlled amount or thickness and therefore, a constant or controlled thickness of backing composition layer is at all the times present between the workpieces 2 and 2 and the belt 6. Thus, the butt-welding process can be automatically carried out by manipulating a welding torch 10 disposed in a suitable operative position with respect to the workpieces while the workpieces are advancing through the welding station.

The following are examples in which the novel one-side back bead-forming butt-welding process by the present invention were sucessfully carried out.

EXAMPLE 1

Two 400 x 600 mm. steel workpieces were cut from a killed mild steel plate stock having a thickness of 32 mm. and one edge of each workpiece was bevelled so as to form a Y-shaped groove (50°) having a depth of 5 mm. when the workpieces were aligned with their bevelled edges facing each other. The workpieces were placed on a backing block with a backing composition interposed between the workpieces and the backing block as shown in FIG. 1.

The backing composition employed comprised the following constituents by weight percentage:

| | Percent |
|---|---|
| Sub-merged arc welding flux (G. 20) | 43.0 |
| Iron powder (less than 10 mesh) | 35.0 |
| Ferrosilicon | 17.5 |
| Phenol resin powder | 4.5 |

The above-mentioned backing composition was spread over the backing block in a width of 60 mm. and a thickness of 25 mm. at and in the vicinity of the bottom of the groove between the workpieces. Using a length of mild steel wire electrode having a diameter of 6.4 mm. (U.S. 43) and sub-merged arc welding flux (P.F.H.–45, 10–48 mesh), a tandem welding operation was performed in accordance with the conventional sub-merged arc welding process.

The welding conditions were:

Leading pass, 1200 a.×(30–34) v.×30 cm./min.
Trailing pass, 1300 a.×(34–36) v.×30 cm./min.

X-ray examination of the butt-welded portion or metal deposited portion of the workpieces indicated that the metal deposit was of a first grade quality when determined in accordance with JIS criteria. The wave-shaped back bead line was smooth and uniform having a width of 12 mm. and a height of 1.5 mm. and no slag was found in the back bead. In addition, no undercuts were found in the back bead line.

TABLE 1.—THE CONSTITUENTS OF FLUX G. 20 AND FLUX P.F.H.-45 (BY WEIGHT PART)

| | G. 20 | P.F.H.-45 |
|---|---|---|
| $SiO_2$ | 54.52 | 20.0 |
| $Al_2O_3$ | 3.81 | 10.0 |
| $FeO$ | 1.03 | trace |
| $TiO_2$ | 0.20 | trace |
| $CaO$ | 31.82 | 20.0 |
| $MgO$ | 9.24 | 40.0 |

Figure 5:
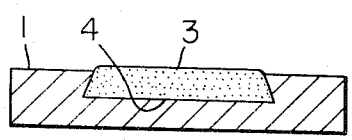
FIG. 5 is a fragmentary sectional view especially illustrating one form of backing block to be employed in carrying out the novel welding process.
Figure 6:
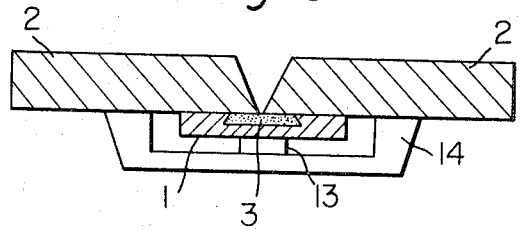
FIG. 6 is a fragmentary view in section of a modified arrangement with which the novel process is carried out.
Figure 7:
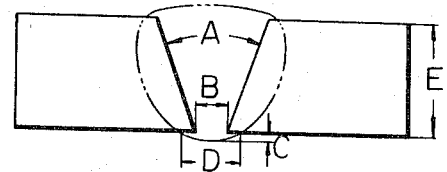
FIG. 7 is a fragmentary end elevational view illustrating the dimensional relation of a groove formed between workpieces.

FIGS. 5 through 7 illustrate embodiments in which a previously solidified backing composition is employed, respectively, in carrying out the novel one-side back bead-forming butt-welding process.

Referring first to FIG. 5, a preferred form of backing block 1 is shown as having a longitudinal recess 4 formed on the upper surface in the center of its width. A heat-solidified backing composition 3 is received in the longitudinal recess 4 of the backing block 1. As mentioned above, the backing composition 3 is first disposed within the recess 4 and then the backing block 1 having the backing composition 3 in its recess 4 is heated by any conventional manner until the composition is solidified. The thus treated backing block 1 in the backing block recess is disposed on the underside of two workpieces 2 and 2 along the bottom of the V-shaped groove G' defined between the opposing bevelled edges of the workpieces with the exposed surface of the solidified backing composition 3 positioned in contact with the underside of the workpieces 2 and 2. The backing block and composition assembly 1 and 3 are held in this position by a hollow U-section supporting member 14 with a wedge or wedges 13 interposed between the assembly and supporting member whereby the backing composition 3 may be firmly and positively abutted against the underside of the workpieces at the bottom of the groove G'. The supporting member 14 may be temporarily secured to the underside of the workpieces 2 and 2 at points laterally spaced from the backing block and composition assembly (see FIG. 6) such as by tack welding. Alternatively, the backing block and composition assembly may be secured to the workpieces with the use of several magnets (not shown).

EXAMPLE 2

In order to carry out the novel butt-welding process using the arrangement as shown in FIG. 5 or 6, the following three types of backing compositions were prepared (Table 2) and then the backing compositions were placed in the recesses of on the surfaces backing blocks, respectively and the backing blocks having the different types of backing compositions in their recesses were heated from the bottom or underside thereof opposite the recess formed side thereof up to 150° C. by a burner so as to solidify the received backing compositions.

TABLE 2
[By weight percent]

| Backing composition | I | II | III |
|---|---|---|---|
| Zircon sand | 20 | | |
| Rutile | 10 | | |
| Magnesia | 12 | 5 | 40 |
| Silica sand | | | 20 |
| Alumina | | | 28 |
| Calcium carbonate | | | 10 |
| Fluorite | 20 | 10 | |
| Ferrosilicon | 5 | | |
| Aluminum | | 12 | |
| Iron powder | 30 | 70 | |
| Phenol resin | 3 | 3 | 2 |

Butt-welding operations were performed on mild steel workpieces having different thicknesses with the use of the above-obtained three types of backing compositions in accordance with the butt-welding process by the present invention. The following Table 3 show the welding conditions employed in these welding operations and the results obtained from the operations.

TABLE 3

| Type of welding process | Hand welding. | Sub-merged arc welding. | Carbonic acid-shielded welding. | Non-gas shielded welding. | Hand welding. |
|---|---|---|---|---|---|
| Position of welding | Upward | Downward | Downward on curved surface. | Downward | Downward. |
| Thickness of workpiece (E) | 20 mm | 25 mm | 16 mm | 19 mm | 16 mm. |
| Flux | I | I | I | II | III. |
| Shape of groove | A=50°; B=3-4 mm | A=.0°; B=3-4 mm | A=50°; B=3-4 mm | A=50°; B=3-4 mm | A=50°; B=3-4 mm. |
| Welding conditions: | | | | | |
| Current (A) | [1] 120-130 | [1] 1,120 | [1] 440 | [1] 420 | [1] 250-260. |
| Voltage (V) | | [1] 38 | [1] 34 | [1] 27 | |
| Velocity (cm./m.) | | [1] 40 | [1] 30 | | |
| Current (A) | [2] 130-140 | [3] 1,000 | [4] 460 | [5] 400 | [6] 270-280. |
| Voltage (V) | | [3] 40 | [4] 37 | [5] 27 | |
| Velocity (cm./m.) | | [3] 25 | [4] 30 | | |
| Dimensions of back bead (Fig. 7): | | | | | |
| (C) | 2 mm | 2 mm | 2 mm | 2 mm | 2 mm. |
| (D) | 10 mm | 15 mm | 15 mm | 15 mm | 10 mm. |
| Slag incorporation | None | None | None | None | None. |
| Undercut | do | do | do | do | Do. |
| Result of X-ray examination | [7] | [7] | [7] | [7] | [7]. |
| Bending test | [8] | [8] | [8] | [8] | [8]. |
| Tension test: | | | | | |
| Tensile strength, kg./mm.² | 49.2 | 48.4 | 47.5 | 54.0 | 48.5. |
| Elongation, percent | 27 | 28 | 32 | 28 | 30. |
| Impact test, vEo kg.-m./cm.² | 16.96 | 9.7 | 4.5 | 6.4 | 18.3. |

[1] First pass.
[2] Second to fifth passes.
[3] Second pass.
[4] Second and third pass.
[5] Second to fourth passes.
[6] Second to fifth passes.
[7] JIS, first grade.
[8] No defects found on roots, faces, sides and any other positions.

While several preferred embodiments of the invention have been shown and described in detail it will be understood that they are for the purpose of illustration only and are not to be taken as limiting the scope of the invention, reference being had for this purpose to the appended claims.

What is claimed is:

1. In a one-side back bead-forming butt-welding process which comprises placing a powdery backing composition in a space defined by the underside of two workpieces disposed in contiguous relation across said underside and the upper surface of supporting means, said space extending along and below a groove formed in and between said workpieces, and welding said workpieces together to form an integral joint, the improvement wherein said composition comprises a particulated thermosetting resin and a slag forming agent, and wherein said thermosetting resin in said composition is set and solidified only under the influence of the heat of said welding to bring said composition into intimate contact with said underside of said workpieces.

2. A one-side back bead-forming butt-welding process, as claimed in claim 1, in which said composition further comprises iron powder.

3. A one-side back bead-forming butt-welding process, as claimed in claim 2, in which said thermosetting resin powder is one which when heated up to 450° C., melts in said backing composition and bonds the other constituents to said composition to form a solid.

4. A one-side back bead-forming butt-welding process, as claimed in claim 2, in which said thermosetting resin powder is a powder of phenol resin, epoxy resin or isocyanate resin.

5. A one-side back bead-forming butt-welding process, as claimed in claim 2, in which the amount of said thermosetting resin powder in said backing composition is within a range 0.2 to 4.0% by weight based on the total weight of said backing composition.

6. A one-side back bead-forming butt-welding process, as claimed in claim 2, in which the amount of said iron powder in said backing composition is within the range of 10 to 90% by weight based on the total weight of said composition.

7. A one-side back bead-forming butt-welding process, as claimed in claim 2, in which the amount of said slag forming agent in said backing composition is 9% by weight based on the total weight of said composition.

References Cited

UNITED STATES PATENTS

| | | | |
|---|---|---|---|
| 2,331,689 | 10/1943 | Hodge | 29—491 |
| 2,399,646 | 5/1946 | Linden | 228—50 |
| 2,441,176 | 5/1948 | Wilson et al. | 228—50 |
| 3,002,272 | 10/1961 | Hodges | 29—491 |
| 3,138,863 | 6/1964 | Clark et al. | 228—50 |

JOHN F. CAMPBELL, Primary Examiner

R. J. SHORE, Assistant Examiner

U.S. Cl. X.R.

228—50

UNITED STATES PATENT OFFICE
Certificate

Patent No. 3,548,489                                          Patented December 22, 1970

Masayasu Arikawa and Katsuro Iio

Application having been made by Masayasu Arikawa and Katsuro Iio, the inventors named in the patent above identified, and Kobe Steel, Ltd., the assignee, for the issuance of a certificate under the provisions of Title 35, Section 256, of the United States Code, adding the names of Motomi Kano and Naoki Okuda as joint inventors, and a showing and proof of facts satisfying the requirements of the said section having been submitted, it is this 22nd day of October 1974, certified that the names of the said Motomi Kano and Naoki Okuda are hereby added to the said patent as joint inventors with the said Masayasu Arikawa and Katsuro Iio.

FRED W. SHERLING,
*Associate Solicitor.*